(12) United States Patent
Lee et al.

(10) Patent No.: US 11,503,142 B2
(45) Date of Patent: Nov. 15, 2022

(54) MOBILE TERMINAL

(71) Applicant: LG ELECTRONICS INC., Seoul (KR)

(72) Inventors: Byunghwa Lee, Seoul (KR); Jonghwan Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 294 days.

(21) Appl. No.: 16/642,346

(22) PCT Filed: Sep. 3, 2019

(86) PCT No.: PCT/KR2019/011346
§ 371 (c)(1),
(2) Date: Feb. 26, 2020

(87) PCT Pub. No.: WO2021/045245
PCT Pub. Date: Mar. 11, 2021

(65) Prior Publication Data
US 2021/0409525 A1    Dec. 30, 2021

(51) Int. Cl.
*H04M 1/02*        (2006.01)
*G06V 40/13*       (2022.01)

(52) U.S. Cl.
CPC ...... *H04M 1/0202* (2013.01); *G06V 40/1318* (2022.01); *G06V 40/1306* (2022.01); *H04M 2201/20* (2013.01)

(58) Field of Classification Search
CPC .............. H04M 1/0202; H04M 1/0266; G06V 40/1318; G06K 9/00

USPC ...................................................... 455/550.1
See application file for complete search history.

(56) References Cited

U.S. PATENT DOCUMENTS

2018/0365472 A1* 12/2018 Cai .................... G02B 13/0025
2019/0042035 A1*  2/2019 Kim ...................... G06V 10/17

FOREIGN PATENT DOCUMENTS

| | | | | |
|---|---|---|---|---|
| JP | 2004199487 A | * | 7/2004 | ......... G06K 9/00013 |
| KR | 1020170119623 | | 10/2017 | |
| KR | 1020190015876 | | 2/2019 | |
| KR | 1020190036194 | | 4/2019 | |
| KR | 1020190047790 | | 5/2019 | |
| KR | 1020190095872 | | 8/2019 | |

OTHER PUBLICATIONS

PCT International Application No. PCT/KR2019/011346, International Search Report dated May 29, 2020, 7 pages.

* cited by examiner

*Primary Examiner* — Ayodeji O Ayotunde
(74) *Attorney, Agent, or Firm* — Lee Hong Degerman Kang & Waimey

(57) ABSTRACT

Provided is a mobile terminal including a front case, a display disposed at a front surface of the front case, a rear case disposed to oppose a rear surface of the front case, and a finger scan sensor part coupled to the rear surface of the front case. The finger scan sensor part may be configured to sense at least a portion of light incident after passing through the display and the front case among light reflected by an external object. Other embodiments are implementable.

13 Claims, 17 Drawing Sheets

MOBILE TERMINAL

CROSS-REFERENCE TO RELATED APPLICATIONS

This application is the National Stage filing under 35 U.S.C. 371 of International Application No. PCT/KR2019/011346, filed on Sep. 3, 2019, the contents of which are all hereby incorporated by reference herein in its entirety.

TECHNICAL FIELD

This disclosure relates to a mobile terminal including a finger scan sensor part.

BACKGROUND ART

Mobile terminals may refer to handheld computing devices that a user can carry around to any place. A representative example of the mobile terminals may be a smart phone.

The mobile terminals are being developed with various functions, and, in particular, a mobile terminal having a finger scan sensor part has recently been introduced in order to authenticate a user based on fingerprint information.

In order to support diverse usability of the mobile terminals, compact, thin, and light-weighted mobile terminals are demanded and also required to have a maximized region where an image can be output. Accordingly, a substantial portion of a front surface of a mobile terminal serves as a screen output region.

For example, regarding a fingerprint sensing region which has been provided separate from a screen output region at a front surface of an existing mobile terminal, there are studies and researches to develop a mobile terminal in a structure in which the fingerprint sensing region is disposed at a rear or side surface of a mobile terminal or disposed to overlap a screen output region, thereby maximizing an area of the screen output region in the front surface of the mobile terminal.

DISCLOSURE OF INVENTION

Technical Goals

In a structure in which a fingerprint sensing region overlaps a screen output region at a front surface of a mobile terminal, a fingerprint sensing part may be provided in a manner that the fingerprint sensing part is adhered to a rear surface of a display from below the display. In this case, it may not possible to detach the finger scan sensor part from the display.

An aspect provides a mobile terminal having a detachable finger scan sensor part.

Technical Solutions

According to an aspect, there is provided a mobile terminal including a front case, a display disposed at a front surface of the front case, a rear case disposed to oppose a rear surface of the front case, and a finger scan sensor part coupled to the rear surface of the front case. The finger scan sensor part may be configured to sense at least a portion of light incident after passing through the display and the front case among light reflected by an external object.

According to another aspect, there is also provided a mobile terminal including a display configured to output an image in a first direction, a front case covering a rear surface of the display facing a second direction opposite to the first direction, a pad part interposed between the front case and the display, a rear case disposed to oppose the rear surface of the front case, the rear surface facing the second direction, a rear cover covering the rear surface of the rear case, the rear surface facing the second direction, and a finger scan sensor part coupled to the rear surface of the front case. The pad part and the front case may respectively have holes corresponding to a position at which the finger scan sensor part is disposed. The finger scan sensor part may be configured to sense at least a portion of light incident after passing through the display, the hole of the pad part, and the hole of the front case among light reflected by an external object.

Effects

According to example embodiments, there may be provided a mobile terminal having a screen displaying region in a front surface thereof, the screen displaying region maximized through a fingerprint sensing region overlapping the screen displaying region. In particular, the mobile terminal may have a finger scan sensor part that is detachable in a manner that the finger scan sensor part is fixed to a rear surface of a front case, rather than adhered directly to a display.

Additional range of applicability of the present disclosure will become clear from the detailed description of the invention in the following. Yet, since it will be apparent to those skilled in the art that various modifications and variations can be made therein without departing from the spirit and scope of the invention, it is to be understood that the following detailed description of the present disclosure and a specific embodiment such as a preferred embodiment of the present disclosure are exemplary and explanatory.

BEST MODE FOR CARRYING OUT THE INVENTION

Figure 1:
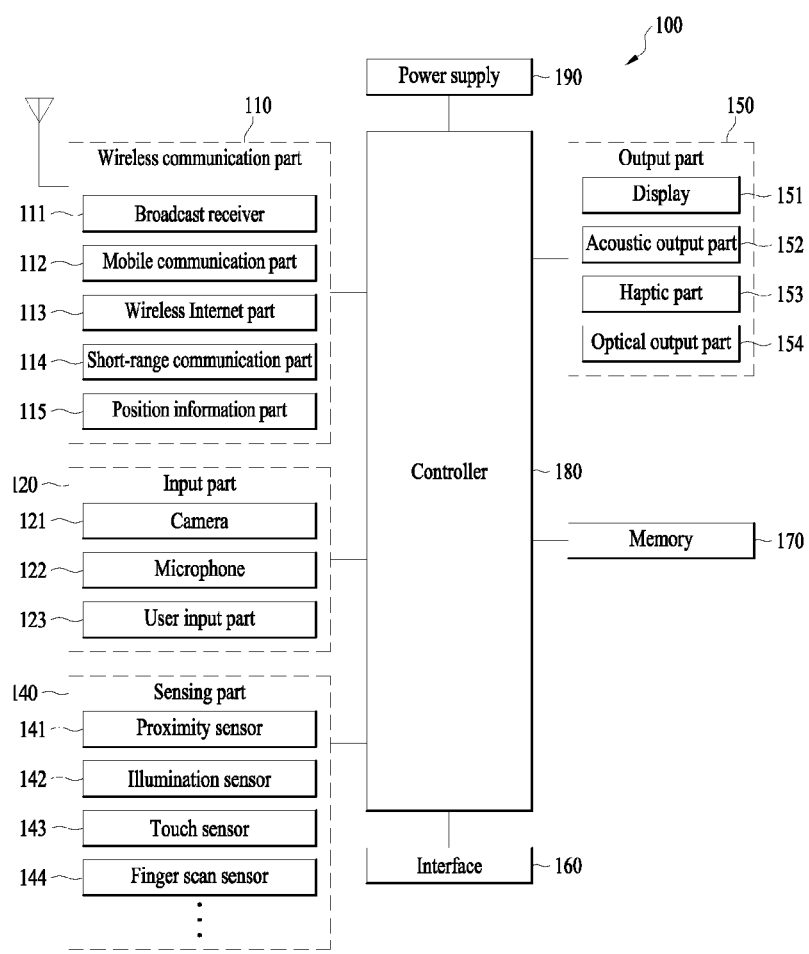
FIG. 1 is a block diagram illustrating a mobile terminal according to an embodiment of the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present disclosure, moreover, the detailed description will be omitted when a specific description for publicly known technologies to which the invention pertains is judged to obscure the gist of the present disclosure. Also, it should be noted that the accompanying drawings are merely illustrated to easily explain the concept of the invention, and therefore, they should not be construed to limit the technological concept disclosed herein by the accompanying drawings.

The terms 'first', 'second', etc. may be used to describe various components, but the components are not limited by such terms. The terms are used only for the purpose of distinguishing one component from other components.

When an arbitrary component is described as "being connected to" or "being linked to" another component, this should be understood to mean that still another component(s) may exist between them, although the arbitrary component may be directly connected to, or linked to, the corresponding other component. In contrast, when an arbitrary component is described as "being directly connected to" or "being directly linked to" another component, this should be understood to mean that no component exists between them.

A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Examples of a mobile terminal described herein may include cellular phones, smart phones, laptop computers, digital broadcast terminals, personal digital assistants (PDAs), portable multimedia players (PMPs), navigators, slate PCs, tablet PCs, ultrabooks, wearable devices (e.g., smart watches, smart glasses, head mounted displays (HMDs)), and the like.

However, the configurations according to the embodiments of this specification may also be applied to stationary terminals such as digital TVs, desktop computers, digital signage and the like, except for configurations applied to only mobile terminals.

FIG. 1 is a block diagram illustrating a mobile terminal according to an embodiment of the present disclosure.

Referring to FIG. 1, the mobile terminal 100 may include a wireless communication part 110, an input part 120, a sensing part 140, an output part 150, an interface 160, a memory 170, a controller 180, a power supply 190, and the like. The constituent elements illustrated in FIG. 1 may not be necessarily required, and the mobile terminal 100 described in the present disclosure may have a greater or less number of elements than those illustrated elements.

The wireless communication part 110 may include at least one module capable of performing wireless communication between the mobile terminal 100 and a wireless communication system, between the mobile terminal 100 and another mobile terminal, or between the mobile terminal 100 and an external server. The wireless communication part 110 may include one or more modules that connect the mobile terminal 100 to one or more networks. For example, the wireless communication part 110 may include at least one of a broadcast receiver 111, a mobile communication part 112, a wireless Internet part 113, a short-range communication part 114, or a position information part 115.

The input part 120 may include an image input part (e.g., a camera 121) to receive an image signal input, an audio input part (e.g., a microphone 122) to receive an audio signal input, or a user input part 123 to receive a user input. For example, the user input part 123 may receive a user touch input through a touch sensor (or a touch panel) 143 provided in a display 151 or may receive a user input through a mechanical key. Information (e.g., voice data, image data, etc.) collected by the input part 120 may be analyzed and processed as a control command of the user.

The sensing part 140 may include one or more sensors configured to sense internal information of the mobile terminal 100, the surrounding environment of the mobile terminal 100, user information, and the like. For example, the sensing part 140 may include a proximity sensor 141, an illumination sensor 142, a touch sensor 143, or a finger scan sensor 144. In addition, the sensing part 140 may include at least one of an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal 100 disclosed herein may utilize information in such a manner of combining information sensed by at least two sensors of those sensors.

The output part 150 may be configured to output an audio signal, a video signal or a tactile signal. The output part 150 may include the display 151, an acoustic output part 152, a haptic part 153, an optical output part 154 and the like The display 151 may be interlayered or integrally formed with a touch sensor (or touch panel) 143, to implement a touch screen that provides a touch inputting function and a scree outputting function. For example, the touch screen may serve not just as a user input part 123 for providing an input interface between the mobile terminal 100 and a user, but also as an output part 150 for providing an output interface an between the mobile terminal 100 and the user.

The interface 160 may serve as a channel to various types of external devices that can be coupled to the mobile terminal 100. The interface 160 may include at least one of a wired or wireless headset port, an external power supply port, a wired or wireless data port, a memory card port, a port for connecting a device having an identification part, an audio input/output (I/O) port, a video I/O port, or an earphone port. The mobile terminal 100 may perform a specific function or control related to a connected external device, in response to the external device being connected to the interface 160.

The memory 170 stores data supporting various functions associated with various functions of the mobile terminal 100. For example, the memory 170 may store application programs (or applications) executed in the mobile terminal 100, and data and instructions for operations of the mobile terminal 100, and the like. For example, at least some of those application programs may be downloaded from an external server via wireless communication. Some others of those application programs may be stored in the memory 170 at the time of being shipped for specific functions of the mobile terminal 100 (e.g., receiving a call, placing a call, receiving a message, sending a message, etc.). The application programs stored in the memory 170 may be executed by the controller 180 to perform an operation (or a function) of the mobile terminal 100.

The controller 180 may control overall operations of the mobile terminal 100. The controller 180 may provide or process information or functions appropriate for a user in a manner of processing signals, data, information and the like, which are input or output by the elements of the mobile terminal 100, or activating the application programs stored in the memory 170.

For example, the controller 180 may control at least part of the elements of the mobile terminal 100 illustrated in FIG. 1A, in order to drive the application programs stored in the memory 170. The controller 180 may drive the application programs by combining at least two of the elements included in the mobile terminal 100.

The power supply 190 may receive external power or internal power and supply appropriate power required for operating respective elements included in the mobile terminal 100 under the control of the controller 180. The power supply 190 may include a battery (e.g., a battery 191 in FIG. 3). The battery may be an embedded battery or a detachable battery.

At least some of those elements of the mobile terminal 100 may operate in cooperation in order to operate, control, or implement a control method of the mobile terminal 100 according to various exemplary embodiments described herein. Furthermore, the operation and control or the control method of the mobile terminal 100 may be implemented in the mobile terminal 100 in such a manner of activating at least one application program stored in the memory 170.

Hereinafter, each aforementioned element will be described in more detail, prior to explaining various exemplary embodiments implemented by the foregoing mobile terminal 100.

First, the wireless communication part 110 will be described. The broadcast receiver 111 of the wireless communication part 110 may receive a broadcast signal and/or broadcast associated information from an external broadcast managing server through a broadcast channel. The broadcast channel may include a satellite channel and/or a terrestrial channel. At least two broadcast receivers may be provided in the mobile terminal 100 to simultaneously receive broadcasts through at least two broadcast channels or to switch the broadcast channels.

The broadcast managing server may refer to a server that generates and transmits a broadcast signal and/or broadcast associated information or may refer to a server that receives a previously generated broadcast signal and/or broadcast associated information and transmits the same to a terminal. The broadcast signal may include not just a TV broadcast signal, a radio broadcast signal, and a data broadcast signal, and a broadcast signal having a data broadcast signal combined with a TV broadcast signal or a radio broadcast signal.

The broadcast signal may be encoded according to at least one of technical standards (or transmission methods, for example, ISO, IEC, DVB, ATSC, etc.) for transmission and reception of digital broadcast signals, and the broadcast receiver 111 may receive the digital broadcast signals using a method appropriate for a technical specification defined in the technical standards.

The broadcast associated information may refer to information associated with a broadcast program or a broadcast service provider The broadcast associated information may also be provided through a mobile communication network. In this case, it may be received by the mobile communication part 112.

The broadcast associated information may be, for example, in various form, such as an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received by the broadcast receiver 111 may be stored in the memory 170.

The mobile communication part 112 may transmit and receive wireless signals to and from at least one of a base station, an external terminal, or a server on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

The wireless signals may include audio call signal, video (telephony) call signal, or various formats of data according to transmission and reception of text/multimedia messages.

The wireless Internet part 113 may refer to a module for supporting wireless Internet access, and may be embedded in the mobile terminal or externally installed outside the mobile terminal 100. The wireless Internet part 113 may transmit and receive wireless signals on communication networks according to wireless Internet technologies.

The wireless internet technology includes Wireless LAN (WLAN), Wireless-Fidelity (Wi-Fi), Wireless Fidelity (Wi-Fi) Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), and the like. The mobile communication part 112 may transmit and receive data according to at least one of wireless internet technology among the aforementioned internet technologies and even other internet technologies not mentioned above.

From the perspective that the wireless Internet accesses according to Wibro, HSDPA, GSM, CDMA, WCDMA, LET and the like are made on a mobile communication network, the wireless Internet part 113 which performs the wireless Internet access via the mobile communication network may be understood as a kind of the mobile communication part 112.

The short-range communication part 114 may be configured to facilitate short-range communications. The short-range communication part 114 may support short-range communication by employing at least one of BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus) technologies. The short-range communication module 114 may support wireless communications between the mobile terminal 100 and a wireless communication system, between the mobile terminal 100 and another mobile terminal, or between the mobile terminal 100 and a network where another mobile terminal (or an external server) is located, via wireless area networks. The wireless area networks may be a wireless personal area networks.

In this case, another mobile terminal may be a wearable device (e.g. a smart watch, a smart glass or a head mounted display (HMD)) which is able to exchange data with the mobile terminal 100 (or cooperate therewith). The short-range communication part 114 may sense (or recognize) the wearable device capable of communicating with the mobile terminal 100 in the surroundings of the mobile terminal 100. In addition, when the sensed wearable device is a device which is authenticated to communicate with the mobile terminal 100, the controller 180 may transmit at least part of data processed in the mobile terminal 100 to the wearable device through the short-range communication part 114. Hence, a user of the wearable device may use the data processed in the mobile terminal 100 on the wearable device. For example, when a call is received in the mobile terminal 100, the user may answer the call using the wearable device, and, when a message is received in the mobile terminal 100, the user can acknowledge the received message using the wearable device.

The position information part 115 may be a module that acquires a position (or current position) of the mobile terminal 100, and a representative example of the position information part 115 may be a global positioning system (GPS) mobile or a Wi-Fi module. For example, the mobile terminal 100 may use the GPS module to acquire a position of the mobile terminal 100 using signals transmitted from a GPS satellite. As another example, the mobile terminal 100 may use the Wi-Fi module to acquire a position of the mobile terminal 100 based on information on a wireless access point (AP) that transmits or receives a wireless signal to or from the Wi-Fi module. As necessary, the position information part 115 may perform a certain function of other modules of the wireless communication part 110 to acquire data on the position of the mobile terminal 100, additionally or in substitution. The position information part 115 may be a module used to acquire a position (or current position) of the mobile terminal 100 and is not limited to a module that directly calculates or acquires a position of the mobile terminal 100.

Next, the input part 120 may be configured to input image information (or signal), audio information (or signal), data, or information input by a user, and may include at least one camera 121 to input the image information. The camera 121 may process image frames of still pictures or video obtained by an image sensor in a video or image capture mode. The processed image frames may be displayed on the display 151 or stored in memory 170. A plurality of cameras 121 provided in the mobile terminal 100 may be arranged in a matrix configuration, and, through the plurality of cameras 121 arranged in the matrix configuration, the mobile terminal 100 may receive a plurality of images having various angles or focal points. For example, the plurality of cameras 121 may be in a stereoscopic arrangement to acquire left and right images for implementing a stereoscopic image.

The microphone 122 may process an external acoustic signal into electrical voice data. The processed voice data may be used in various manners according to a function performed (or an application program executed) in the mobile terminal 100. Meanwhile, in the microphone 122, various noise removal algorithms may be implemented to remove noise generated in the course of receiving external acoustic signals.

The user input part 123 may be to receive information from a user. When the information is input through the user input part 123, the controller 180 may control an operation of the mobile terminal 100 based on the input information. The user input part 123 may include a mechanical input means (or a mechanical key, for example, a button positioned at least one of a front surface, a rear surface, and a side surface of the mobile terminal 100 (e.g., a first manipulation part 123a, a second manipulation part 123b, a dome switch, a jog wheel, a jog switch, and the like in FIGS. 2A and 2B)) and a touch input means. For example, the touch input means may include at least one of a virtual key, a soft key, or a visual key displayed on a touch screen through a software process. In addition, the touch input means may further include a touch key in a portion other than the touch screen. The virtual key or the visual key may each be displayed in a variety of forms and be any one or in a combination of, for example, graphics, texts, icons, and videos.

The sensing part 140 may sense internal information of the mobile terminal, the surrounding environment of the mobile terminal, user information, and the like, and generate a sensing signal corresponding thereto. Based on the sensing signal, the controller 180 may control driving or an operation of the mobile terminal 100 or may perform a process, a function, or an operation associated with an application program installed in the mobile terminal 100. In the following description, typical sensors among various sensors capable of being included in the sensing part 140 will be described in more detail.

The proximity sensor 141 may include a sensor to sense presence or absence of an object approaching or located near a predetermined detecting surface, by using an electromagnetic field, infrared rays, or the like. The proximity sensor 141 may be arranged at an inner region of the mobile terminal 100 or near the display 151.

The proximity sensor 141 may include at least one of a transmissive type photoelectric sensor, a direct reflective type photoelectric sensor, a mirror reflective type photoelectric sensor, a high-frequency oscillation proximity sensor, a capacitive proximity sensor, a magnetic type proximity sensor, or an infrared proximity sensor. For example, when the touch sensor (or a touch panel) 143 provided in the display 151 is implemented as a capacitive sensor, the proximity sensor 141 may sense proximity of an object based on a changes of an electromagnetic field, which is responsive to an approach of the object with conductivity. In this case, the touch screen 143 may be categorized as a proximity sensor.

The proximity sensor 141 may sense a proximity touch and a proximity touch pattern (e.g., distance, direction, speed, time, position, moving status, and the like of the proximity touch). The controller 180 may process data (or information) corresponding to a proximity touch and a proximity touch pattern sensed by the proximity sensor 141, and may output visual information corresponding to the processed data to the display 151. Based on whether a touch to an specific point on the display 151 is either a proximity touch or a contact touch, the controller 180 may control the mobile terminal 100 to execute different operations or process different data.

The touch sensor 143 may sense a touch (or touch input) applied to the touch screen (e.g., the display 151) using at least one of various touch recognition methods including a resistive type, a capacitive type, an infrared type, an ultrasonic type, a magnetic field type, and the like.

As one example, the touch sensor 143 may include a plurality of sensing electrodes. The touch sensor 143 may sense change of pressure applied to a specific part of the display 151 or change of capacitance occurring at a specific part of the display, and convert the sensed change into an electric input signal. The touch sensor 143 may also be configured to sense a touch position, a touched area, a touch pressure, a touch capacitance, and the like at the time when a touch is applied to the touch screen by a touching object. The touch object is an object that applies a touch to the touch sensor 143. For example, the touch object may be a finger, a touch pen, a stylus pen, a pointer, or the like.

When a touch input to the touch sensor 143 is sensed, a corresponding signal(s) may be transmitted to a touch controller. The touch controller may process the received signal(s), and then transmit corresponding data to the controller 180. Accordingly, the controller 180 may acquire touch information as to which region of the display 151 has been touched. The touch controller may be an element separate from the controller 180 or may be the controller 180 itself.

The controller 180 may execute a specific function according to a touch input of touching at least one of the touch screen implemented using the display 151 or a touch key separate from the touch screen. The controller 180 may execute the same or different controls according to a type of a touch object. Alternatively, the controller 180 may perform the same control, regardless of a type of a touch object. For example, weather to execute the same or different control may be decided based on a current operating state of the mobile terminal 100 or a currently executed application program.

The touch sensor 143 and the proximity sensor 141 may be implemented independently or in combination to sense various types of touches. Such touches may include a short (or tap) touch, a long touch, a multi-touch, a drag touch, a flick touch, a pinch-in touch, a pinch-out touch, a swipe touch, a hovering touch, and the like.

The finger scan sensor 144 may be an element to sense information for scanning a user's fingerprint. The controller 180 may use fingerprint sensing information sensed by the finger scan sensor 144 as a means for authentication. The finger scan sensor 144 may be disposed at an inner side of the mobile terminal 100, and the finger scan sensor 144 may sense fingerprint information associated with a user's finger in contact (or in proximity) with any one specific region in a front surface, a side surface, or a rear surface of the mobile terminal 100. The finger scan sensor 144 may include a capacitive finger scan sensor or an optical finger scan sensor.

The capacitive finger scan sensor may scan a fingerprint using a conductor. For example, in response to contact of a finger of a user, the capacitive finger scan sensor may determine a potential difference between the ridge and the in a fingerprint and scan the shape of the fingerprint corresponding to the finger in contact. However, it may be difficult for the capacitive finger scan sensor to precisely scan a fingerprint when a distance between the conductor and the user's finger is equal to or greater than a predetermined distance.

The optical finger scan sensor may scan a shape of a fingerprint in contact (or in proximity) with the finger scan sensor by sensing a light reflected by an external object (e.g., a user's finger). For example, since the ridge and the valley of a fingerprint have different rate of absorption or reflection of a light incident from the outside, the optical finger scan sensor may scan the fingerprint by analyzing an acquired image based on a light incident after being reflected by the external object.

An ultrasonic sensor may recognize position information relating to a touch object using ultrasonic waves. The controller 180 may calculate a position of a wave generating source based on information sensed by an optical sensor and a plurality of ultrasonic sensors. The position of the wave generation source may be calculated on the basis of the fact that light is much faster than ultrasonic waves and thus the time for which the light reaches the optical sensor is much shorter than the time for which the ultrasonic wave reaches the ultrasonic sensor. For instance, the controller 180 may determine the position of the wave generating source using the time difference from the time that the ultrasonic wave reaches the sensor based on the light as a reference signal.

The camera 121 included in the input part 120 may include at least one of a camera sensor (e.g., a charge coupled device (CCD), a Complementary metal-oxide-semiconductor (CMOS), etc.), a photo sensor (or an image sensors), or a laser sensor. For example, the camera 121 may sense contact (or proximity) of a touch object with respect to with respect to a 3D stereoscopic image using a plurality of sensors. For example, the photo sensor may be laminated on a display device of the display 151, and the photo sensor may scan movement of a touch object in contact (or proximity) to the touch screen (e.g., the display 151). In more detail, the photo sensor may include photo diodes and transistors at rows and columns and configured to acquire an electric signal changing based on the quantity of light applied to the photo diode and scan a touch object in proximity to the photo sensor by making a determination as to the electric signal. The photo sensor may calculate the coordinates of the touch object according to variation of light to thereby obtain position information of the touch object.

As the output part 150, the display 151 may display (or output) information processed in the mobile terminal 100. For example, the display 151 may display (or output) execution screen information of an application program executing at the mobile terminal 100 or user interface (UI) and graphic user interface (GUI) information in response to the execution screen information.

In some embodiments, the display 151 may be implemented as a stereoscopic display for displaying a stereoscopic image. For example, the stereoscopic display may employ a stereoscopic display scheme such as a stereoscopic scheme (a glass scheme), an auto-stereoscopic scheme (glassless scheme), a projection scheme (holographic scheme), or the like.

The acoustic output part 152 may output audio data, received from the wireless communication part 110 or stored in the memory 170, in a signal reception mode, a call mode, a record mode, a voice recognition mode, a broadcast reception mode, and the like. The acoustic output part 152 may provide an acoustic signal related to a particular function (e.g., a call signal receiving sound, a message receiving sound, etc.) performed in the mobile terminal 100. The acoustic output part 152 may include a receiver, a speaker, a buzzer, etc.

A haptic part 153 may generate various tactile effects that a user feels, perceives, or otherwise experiences. The tactile effects generated by the haptic part 153 may include vibration. The strength, pattern and the like of the vibration generated by the haptic part 153 may be controlled by user selection or setting by the controller. For example, the haptic part 153 may output vibrations of different strength or patterns in combination or in sequence.

Besides vibration, the haptic part 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic part 153 may be configured not just to transmit tactile effects through a user's direct contact using a user's muscular sense with a head, a face, a finger or a hand. The haptic part 153 may be provided in two or more in number according to the configuration of the mobile terminal 100.

The optical output part 154 may output a signal for notifying occurrence of an event using light of a light source of the mobile terminal 100. Examples of events generated in the mobile terminal 100 may include message reception, call signal reception, a missed call, an alarm, a schedule notification, email reception, information reception through an application, and the like.

A signal output by the optical output part 154 may be implemented in such a manner that the mobile terminal emits monochromatic light or light with a plurality of colors through a front surface or a rear surface. For example, the signal output may be terminated based on whether the mobile terminal 100 detects the user's event confirmation.

The interface 160 serves as for a channel to external devices to be connected with the mobile terminal 100. The interface 160 may allow data reception or power supply from an external device and transmit received data and/or power to each element in the mobile terminal 100. Alternatively, the interface may transmit internal data and/or power of the mobile terminal 100 to an external device. For example, the interface 160 may include at least one of a wired or wireless headset port, an external power supply port, a wired or wireless data ports, a memory card ports, a port for connecting a device having an identification part (e.g., the interface 160 in FIG. 3), an audio input/output (I/O) ports, a video I/O ports, or an earphone ports.

For example, the identification part may be configured as a chip for storing various information required to authenticate an authority to use the mobile terminal 100. The identification part may include a user identity module (UIM), a subscriber identity module (SIM), a universal subscriber identity module (USIM) and the like. The device having the identification part (also referred to herein as an "identifying device") may take the form of a smart card. Accordingly, the identifying device may be connected with the terminal 100 via the interface 160.

The interface 160 may serve as a channel for power to be supplied from an external cradle to the mobile terminal 100 when the mobile terminal 100 is connected to the external cradle or as a channel for transferring various command signals inputted from the cradle by a user to the mobile terminal 100. Such various command signals or power inputted from the cradle may operate as signals for recognizing that the mobile terminal 100 has accurately been mounted to the cradle.

The memory 170 may store programs to support operations of the controller 180 and may temporarily store input/output data (e.g., phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a solid state disk (SSD) type, a silicon disk drive (SDD) type, a multimedia card micro type, a card-type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The mobile terminal 100 may operate in association with a web storage that performs the storage function of the memory 170 on the Internet.

As aforementioned, the controller 180 may typically control an operation associated with an application program and general overall operations of the mobile terminal 100. For example, when a state of the mobile terminal meets a preset condition, the controller 180 may set or release a lock state for restricting a user from inputting a control command with respect to applications.

The controller 180 may, for example, perform controlling and processing related to voice calls, data communications, video calls, and the like, or perform pattern recognition processing to recognize a handwriting input or a picture drawing input to a touch screen implemented by the display 151 as characters or images, respectively.

The controller 180 may control any one or combination of the aforementioned elements in order to implement various exemplary embodiment disclosed herein on the mobile terminal 100.

The power supply 190 may receive external power or internal power and supply appropriate power required for operating respective elements included in the mobile terminal under the control of the controller 180. The power supply 190 may include a battery (e.g., a battery 191 in FIG. 3). The battery may be a rechargeable embedded battery and may be detachably coupled to a terminal body for charging.

In some implementations, the power supply 190 may be connected with an external charger through a connection port provided as an example of the interface 160. For example, the power supply 190 may be electrically connected with the external charger through the connection port to recharge the battery using power received from the external charger.

As another example, the power supply 190 may control recharging the battery in a wireless manner without use of the connection port. For example, the power supply 190 may receive power, transferred from an external wireless power transmitter, using at least one of an inductive coupling method, which is based on magnetic induction, or a magnetic resonance coupling method, which is based on electromagnetic resonance.

Various embodiments described herein may be implemented in a computer-readable or its similar medium using, for example, software, hardware, or any combination thereof.

Figure 2A:
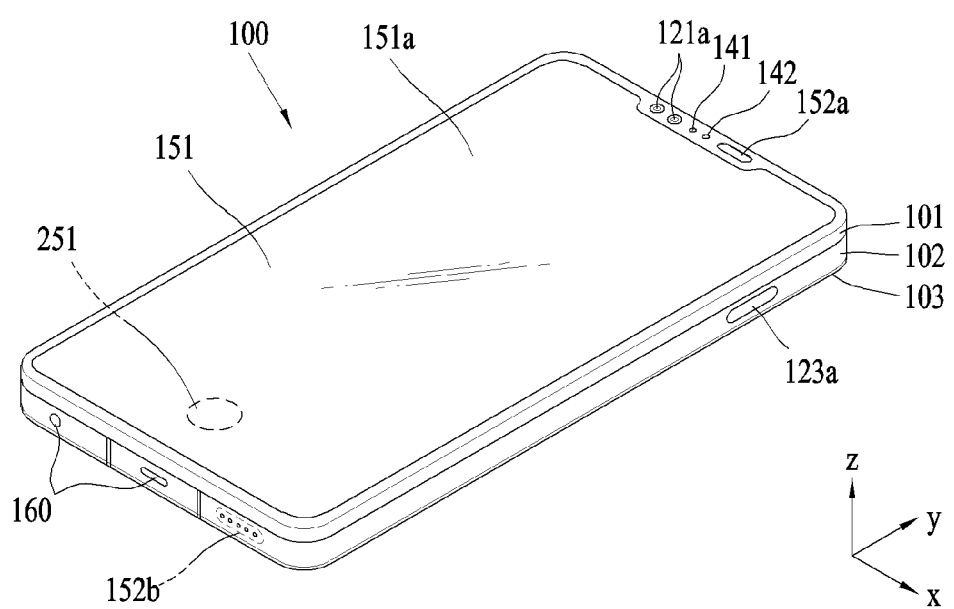
FIG. 2A is a front perspective view of a mobile terminal according to an embodiment of the present disclosure.
Figure 2B:
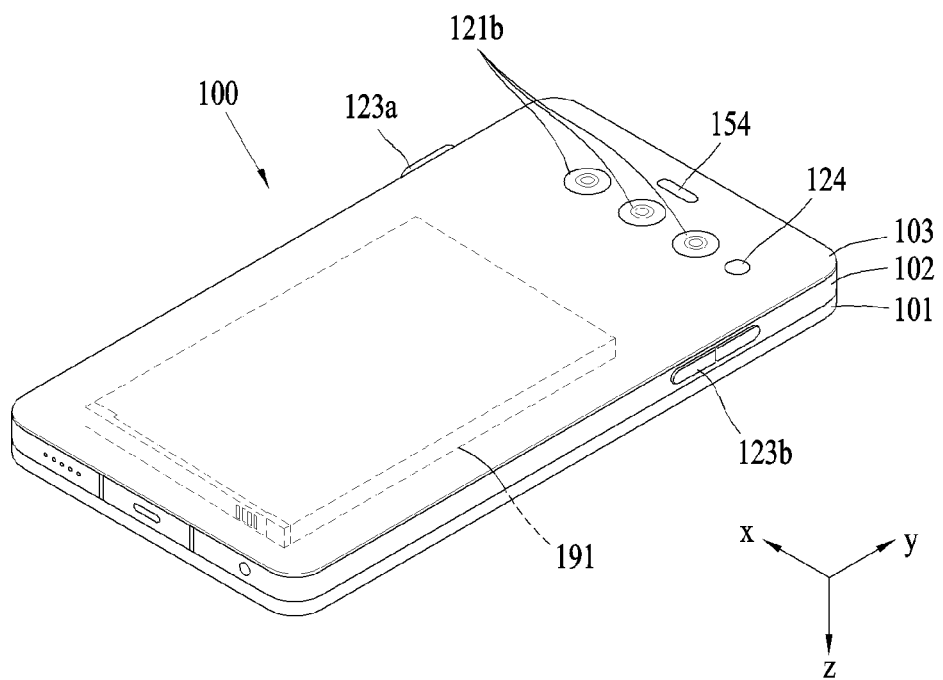
FIG. 2B is a rear perspective view of a mobile terminal according to an embodiment of the present disclosure.

FIG. 2A is a front perspective view of a mobile terminal 100 according to an embodiment of the present disclosure. FIG. 2B is a rear perspective view of the mobile terminal 100 of FIG. 2A.

Referring to FIGS. 2A and 2B, the mobile terminal 100 according to an embodiment of the present disclosure may include a bar-type terminal body.

Yet, the mobile terminal 100 according to various embodiments of the preset disclosure are not limited to the example shown in FIGS. 2A and 2B, and the mobile terminal 100 may include, for example, any of various types including a watch type, a clip type, a glass type, or may be a folder-type, a flip-type, a slide-type, a swing-type, and a swivel-type in which two and more bodies are combined with each other in a relatively movable manner, and combinations thereof. The terminal body may be understood as a concept of referring to the mobile terminal 100 as at least one aggregate.

The mobile terminal 100 may include at least one of a frame, a housing, or a cover as a case that forms an appearance. For example, the mobile terminal 100 may include a front case 101 and a rear case 102, as illustrated in FIGS. 2A and 2B. In addition, the mobile terminal 100 may further include a rear cover 103 for covering a rear surface of the rear case 102, as illustrated in FIG. 2B.

A display 151 may be disposed at a front surface of the front case 101, and the display 151 may constitute at least a portion of a front surface of the mobile terminal 100. For example, a window 151a of the display 151 may be mounted to (or coupled to) the front case 101 to form the front surface of the mobile terminal 100 together with the front case 101.

The display 151 may output an image toward a first direction (e.g., a direction +z in FIG. 2A). On the contrary to the examples shown in FIGS. 2A and 2B, the display 151 may form not just the front surface of the mobile terminal 100, but also at least a portion of a side or rear surface of the mobile terminal 100.

Various electronic components may be positioned in a space between the display 151 and the front space 101, a space between the front case 101 and the rear case 102, and/or a space between the rear case 102 and the rear cover 103.

In some cases, an electronic component may be mounted even to the rear case 102. For example, an electronic component capable of being mounted to the rear case 102 may include at least one of a detachable batter 191, an identification part, or a memory card. When an electronic component is mounted to the rear case 102, the rear cover 103 may be detachably coupled in order to protect the electronic component mounted to the rear case 102. Accordingly, when the rear cover 103 is detached from the rear case 102, the electronic component mounted to the rear case 102 may be exposed to an outside.

When the rear cover 103 is coupled to the rear case 102, a part of a side surface of the rear case 102 may be visible from the outside. On the contrary to what is illustrated, when the rear cover 103 is coupled to the rear case 102, the rear case 102 may be completely hidden by the rear cover 103.

Openings through which a camera 121b, an acoustic output part 152b, and various interfaces 160 are exposed to an outside may be provided in at least one of the front case 101, the rear case 102, or the rear cover 103.

Such cases (e.g., the front case 101, the rear case 102, and the rear cover 103) may be formed by injection molding of synthetic resin or may be formed using at least one of stainless still (STS), aluminum (AI), or titanium (Ti), for example.

On the contrary to the above-described embodiment in which a plurality of cases forms an internal space for accommodating various electronic components, a single case may be provided in the mobile terminal 100 to form the internal space. In this case, the mobile terminal 100 may be implemented in a unibody formed in a manner that synthetic resin extends from a side surface to a rear surface.

The mobile terminal 100 may include a waterproofing part (not shown) for preventing introduction of water into the terminal body. For example, the waterproofing part may include a waterproofing member which is located between the window 151a of the display 151 and the front case 101, between the front case 101 and the rear case 102, or between the rear case 102 and the rear cover 103, to hermetically seal an inner space when those cases are coupled.

The mobile terminal 100 is shown having a first acoustic output part 152a, a second acoustic output part 152b, a proximity sensor 141, an illumination sensor 142, an optical output part 154, a first camera 121a, a second camera 121b, a first manipulation part 123a, a second manipulation part 123b, an interface 160, and the like. Hereinafter, description will be given, as illustrated in FIGS. 2A and 2B, of an exemplary embodiment of a mobile terminal 100, in which the display 151, the first acoustic output part 152a, the proximity sensor 141, the illumination sensor 142, and the first camera 121a are disposed on a front surface of a terminal body, in which the first manipulation part 123a, the second manipulation part 123b, the second acoustic output part 152b, and the interface 160 are disposed on a side surface of the terminal body, and in which the optical output part 154, the second acoustic output part 152b, and the second camera 121b are disposed on a back surface (rear surface) of the terminal body.

However, it is to be understood that alternative arrangements are possible and within the teachings of the instant disclosure. Some elements may be omitted, substituted, or arranged on different surfaces. For example, at least one of the first manipulation part 123a, the second manipulation part 123b, or the interface 160 may not be provided, and the first manipulation part 123a may be provided in the front surface of the terminal body.

The display 151 may display (output) information processed in the mobile terminal 100. For example, the display 151 may display execution screen information of an application program executed in the mobile terminal 100 or may display user interface (UI) and graphic user interface (GUI) information based on the execution screen information.

The display 151 may include at least one of a liquid crystal display (LCD), a thin film transistor-liquid crystal display (TFT-LCD), an organic light emitting diode (OLED), a flexible display, a 3-dimensional (3D) display, or an e-ink display.

The display 151 may be provided in two or more in number according to how the mobile terminal 100 is implemented. In this case, in the mobile terminal 100, a plurality of displays may be arranged on one side surface, either spaced apart from each other or integrated, or may be arranged on different surfaces.

The display 151 may include a touch sensor (e.g., the touch sensor 143 in FIG. 1) to sense a touch input to the display 151 so as to receive a control command in a touching manner. For example, when a touch is input to the display 151, the touch sensor 143 may sense the touch and the mobile terminal 100 (e.g., the controller 180 in FIG. 1) may generate a control command or other signal corresponding to the touch. The content which is input in the touching manner may be a text or numerical value, or a menu item which can be indicated or designated in various modes.

The touch sensor 143 may have a touch pattern composed of a plurality of sensing electrodes. The touch sensor 143 may take the form of a film in the display 151, disposed between the window 151a and a display (not shown) at a rear surface of the window 151a, or may be a metal wire patterned directly on the rear surface of the window 151a. Alternatively, the touch sensor 143 may be integrally formed with the display (not shown). For example, the touch sensor 143 may be disposed on a substrate of the display (not shown) or may be provided inside the display (not shown).

As such, the display 151 may form a touch screen using the touch sensor 143, and, in this case, the touch screen may serve as a user input part (e.g., the user input part 123 in FIG. 1).

The display 151 may include a fingerprint sensing region 251 at one region. The mobile terminal 100 may include a finger scan sensor (e.g., the finger scan sensor 144 of FIG. 1) for scanning a user's fingerprint, and the mobile terminal 100 may use fingerprint information sensed by the finger scan sensor as a means for authentication.

For example, the finger scan sensor may be disposed inside the display 151 and may acquire fingerprint information by sensing light incident into the finger scan sensor after passing through the display 151. The mobile terminal 100 may use the finger scan sensor to acquire fingerprint information associated with a user's finger in contact or proximity with the fingerprint sensing region 251.

The first acoustic output part 152a may be implemented in the form of a receiver to transfer voice sound to a user's ear, and the second acoustic output part 152b may be implemented in the form of a loud speaker to output alarm sound, multimedia audio reproduction, and the like.

The window 151a of the display 151 may include an acoustic hole to release sound generated by the first acoustic output part 152a. Yet, aspects of the present disclosure are not limited thereto, and the sound may be released along an assembly gap between the structural bodies (e.g., a gap between the window 151a and the front case 101).

The optical output part 154 may output light to an outside in response to occurrence of an event. Examples of such events include message reception, call signal reception, a missed call, an alarm, a schedule notification, email reception, information reception through an application, and the like. When a user' acknowledgment of an event is sensed, the mobile terminal 100 may control the optical output part 154 to stop outputting light.

The first camera 121a may process image frames such as still or moving images obtained by the image sensor in a capture mode or a video call mode. The processed image frames may be displayed on the display 151 or stored in the memory 170.

The first manipulation part 123a and the second manipulation part 123b are examples of the user input part 123 to be manipulated by a user in order to control an operation of the mobile terminal 100, and the first and second manipulation parts may be referred to as a manipulating portion. The first and second manipulation parts 123a and 123b may employ any tactile method that allows the user to perform manipulation such as touch, push, scroll, or the like. The first and second manipulation parts 123a and 123b may also employ any non-tactile method that allows the user to perform manipulation such as proximity touch, hovering, or the like. For example, the first and second manipulation parts 123a and 123b may be configured as any one of a mechanical key and a touch key or a combination thereof.

The content input by the first and second manipulation parts 123a and 123b may be set in various ways. For example, the first manipulation part 123a may receive an input to a menu, home key, cancel, search, or the like, and the second manipulation part 123b may receive an input to control a volume level being output from the first or second acoustic output parts 152a or 152b, to switch to a touch recognition mode of the display 151, or the like.

The interface 160 may serve as a channel to connect the mobile terminal 100 to an external device. For example, the interface 160 may be at least one of an access terminal for access to another device (e.g., an earphone and an external speaker), a port for short-range communication (e.g., an infrared port (IrDA Port), a Bluetooth port, a Wireless LAN port, and the like), or a power supply terminal for power supply to the mobile terminal 100. The interface 160 may be implemented in the form of a socket for accommodating an external card such as a subscriber identification module (SIM), a user identity module (UIM), or a memory card for storing information.

A second camera 121b may be disposed at the rear surface of the terminal body. In this case, the second camera 121b may have a photographing orientation substantially opposite to that of the first camera 121a.

The second camera 121b may include a plurality of lenses arranged along at least one line. The plurality of lenses may be arranged in a matrix configuration. Such cameras may be referred to as an "array camera." When the second camera 121b is implemented in the form of the array camera, it is possible to capture images in various manners using the plurality of lenses and acquire images with higher quality. Such cameras may be referred to as an "array camera." When the second camera 121b is implemented in the form of the array camera, it is possible to capture images in various manners using the plurality of lenses and acquire images with higher quality.

A flash 124 may be disposed to be adjacent to the second camera 121b. When an image of a subject is captured with the second camera 121b, the flash 124 may illuminate the subject.

The second acoustic output part 152b may be further included in the terminal body. The second acoustic output part 152b may implement a stereoscopic sound function together with the first acoustic output part 152a and may be used to implement a speaker phone mode for call communication.

At least one antenna for wireless communication may be provided in the terminal body. The antenna may be installed in the terminal body or formed in a case. For example, an antenna which constitutes a part of the broadcast receiver 111 may be retractable into the terminal body. Alternatively, an antenna may be implemented in the form of a film attached to an inner surface of the rear cover 103 or may be implemented in the form of a case containing a conductive material.

The power supply 190 (see FIG. 1) to supply power to the mobile terminal 100 may be provided in the terminal body. The power supply 190 may include a battery 191 which is embedded in the terminal body or detachably coupled to an outside of the terminal body.

The battery 191 may receive power via a power source cable connected to the interface 160. In addition, the battery 191 may be recharged in a wireless manner using a wireless charger.) Wireless charging may be implemented by magnetic induction or resonance (electromagnetic resonance).

The rear cover 103 is shown coupled to the rear case 102 to shield the battery 191, preventing separation of the battery 191 and protecting the battery 191 from an external impact or from foreign material. When the battery 191 is detachable from the terminal body, the rear cover 103 may be detachably coupled to the rear case 102.

An accessory for protecting an appearance or assisting or extending the functions of the mobile terminal 100 may be provided in the mobile terminal 100. One of examples of the accessory may include a cover or pouch for covering and accommodating at least one surface of the mobile terminal 100. The cover or pouch may cooperate with the display 151 to extend the function of the mobile terminal 100. Another example of the accessory may be a touch pen for assisting or extending a touch input to a touch screen.

Figure 3:
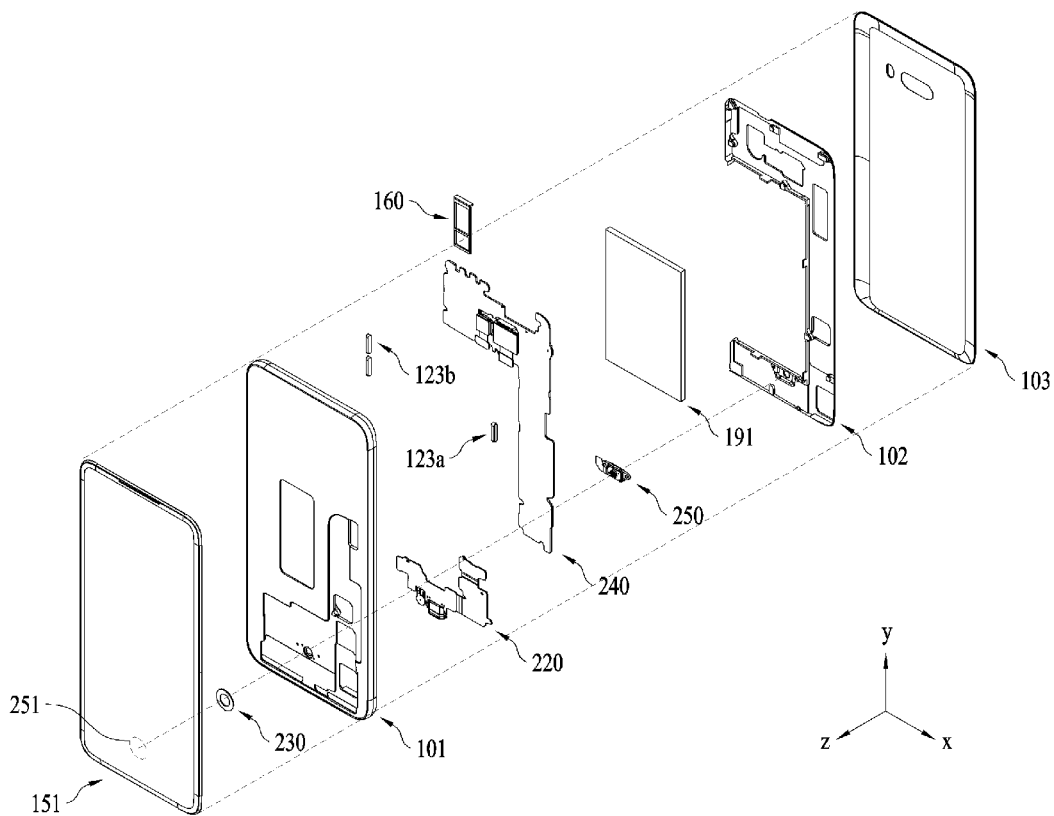
FIG. 3 is an exploded perspective view of a mobile terminal according to an embodiment of the present disclosure.

FIG. 3 is an exploded perspective view of a mobile terminal according to an embodiment of the present disclosure.

Referring to FIG. 3, a mobile terminal 100 may be in a structure in which a display 151, a front case 101, a printed circuit board (PCB) (e.g., a main PCB 240 and a lower PCB 220), a finger scan sensor part 250, a rear case 102, a rear cover 103 are arranged sequentially.

The display 151 may be disposed at a front surface of the front case 101, and the rear case 102 may be disposed at a rear surface of the front case 101. For example, the front surface of the front case 101 may refer to a surface facing z direction shown in FIG. 3, and the rear surface of the front case 101 may refer to a surface facing a direction opposite to −z direction, a direction opposite to the direction which the front surface of the front case 101 faces Between the front case 101 and the rear case 102, a variety of electronic components may be arranged, which include, for example, a first manipulation part 123a, a second manipulation part 123b, an interface 160 in the form of a socket for accommodating an external card, the finger scan sensor part 250, the PCB, and the like.

When a user's finger comes into contact (or proximity) with the fingerprint sensing region 251 provided in one region of the display 151, the finger scan sensor part 250 may acquire fingerprint information associated with the user's finger. Since a specific gap is present between the front surface of the display 151, with which the user's finger is in contact, and the finger scan sensor part 250, the finger scan sensor part 250 may be an optical finger scan sensor. The finger scan sensor part 250 including the optical finger scan sensor may scan a fingerprint by sensing light incident after passing through the display 151 and the front case 101.

The mobile terminal 100 may emit light, for example, using an LED or an OLED provided in the display 151. The light emitted by the mobile terminal 100 may be reflected by an external object in contact (or proximity) with the fingerprint sensing region 251 of the display 151, pass through the display 151 and the front case 101, and be then incident into the finger scan sensor part 250. Using the light incident into the finger scan sensor part 250, the mobile terminal 100 may acquire fingerprint information.

The finger scan sensor part 250 may be coupled to the rear surface of the front case 101 in a space between the front case 101 and the rear case 102. For example, the finger scan sensor part 250 may be fixed to the rear surface of the front case 101, while mounted on the PCB (e.g., the lower PCB 220). Regarding this, a detailed description will be provided with reference to FIGS. 4A to 4C.

Figure 4A:
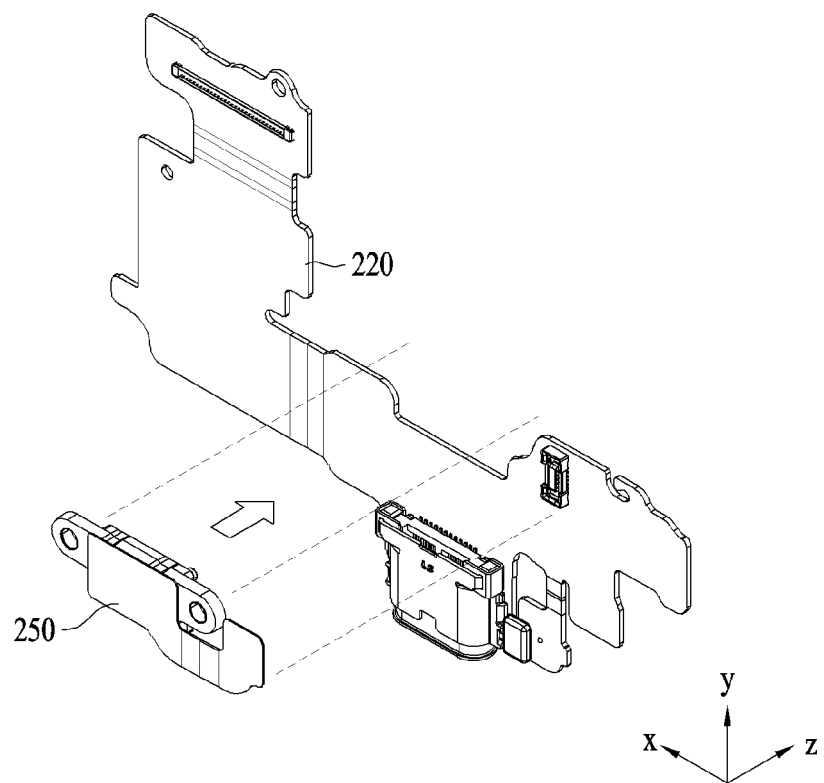
FIGS. 4A to 4C are schematic diagrams illustrating a structure of how a finger scan sensor part according to an embodiment of the present disclosure is mounted.
Figure 4B:
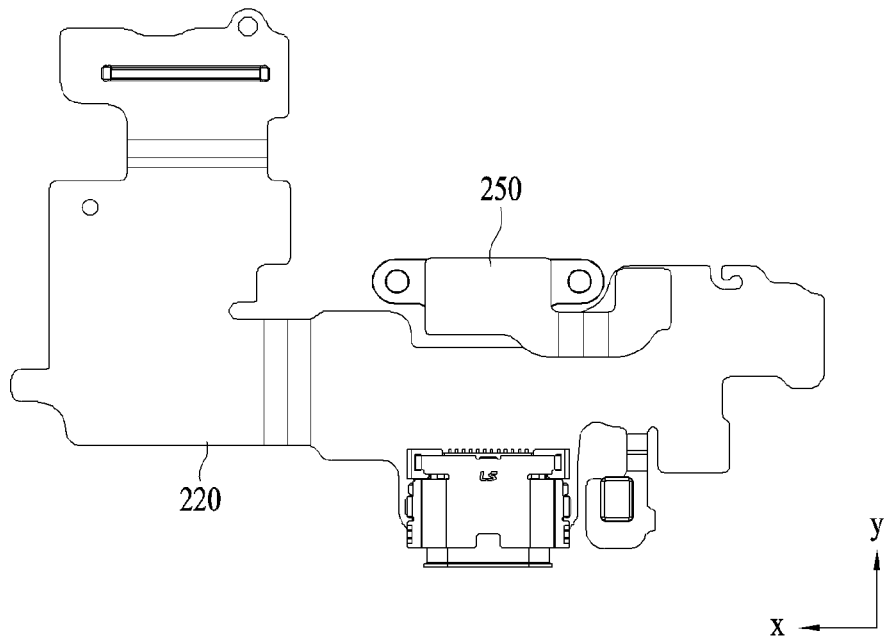
Figure 4C:
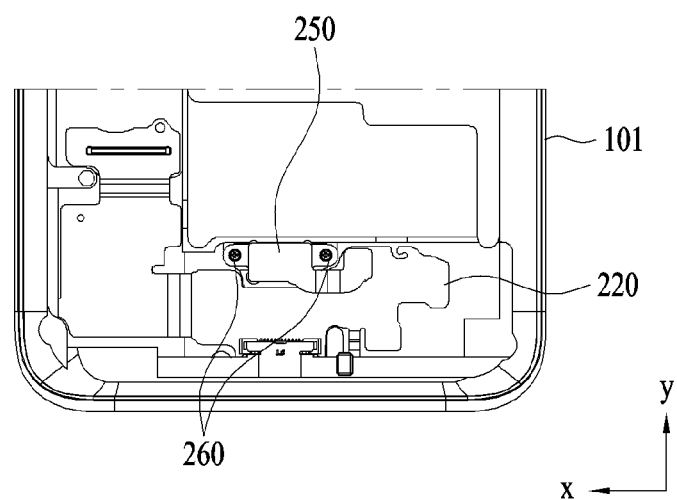

FIGS. 4A to 4C are schematic diagrams illustrating a structure of how a finger scan sensor part according to an embodiment of the present disclosure is mounted.

Referring to FIGS. 4A to 4C, the finger scan sensor part 250 may be coupled to the PCB while mounted on the PCB, for example, a rear surface of the lower PCB 220. In addition, the finger scan sensor part 250 may be coupled to the rear surface of the front case 101 while mounted on the PCB.

The finger scan sensor part 250 and the lower PCB 220 may be electrically connected with each other. For example, the finger scan sensor part 250 may be electrically connected with a port provided in the lower PCB 220 through a port 252 provided in the finger scan sensor part 250, which will be described with reference to FIG. 6, to exchange data and/or power with the lower PCB 220.

As illustrated in FIG. 4C, the finger scan sensor part 250 mounted on the lower PCB 220 may be fixed to the rear surface of the front case 101 by a fastening member 260.

The fastening member 260 may fix the finger scan sensor part 250 to the rear surface of the front case 101, for example, through screw fastening. To this end, a plurality of female thread portions (not shown) for the screw fastening may be provided in the front case 101, and, as the fastening member 260 is fixed by the female threads (not shown) of the front case 101, the finger scan sensor part 250 may be coupled to the rear surface of the front case 101.

According to various embodiments of the present disclosure, since the finger scan sensor part 250 is fixed to the rear surface of the front case 101 through the fastening member 260, the mobile terminal 100 may be reassembled, unlike the case where the finger scan sensor part 250 is adhered directly to the rear surface of the display 151 using adherence, and thus replacement of some components may be carried out easily, when necessary. Since the finger scan sensor is firmly fixed at a preset position in the front case 101 using the fastening member 260, it is possible to prevent displacement of the finger scan sensor part 250 by an external impact.

Referring to FIG. 3, the lower PCB 220 may be electrically connected to the main PCB 240. The main PCB 240 may, for example, exchange data associated with the finger scan sensor part 250 from the lower PCB 220.

In the present specification, there is illustrated a structure in which the main PCB 240 and the lower PCB 220 are provided separately but connected electrically with each other: however, it is understood that the PCB of the mobile terminal 100 may be formed as an integral component.

A pad part 230 for filling a space between the display 151 and the front case 101 may be provided between the display 151 and the front case 101. Regarding this, a detailed description will be provided with reference to FIGS. 5A and 5B.

Figure 5A:
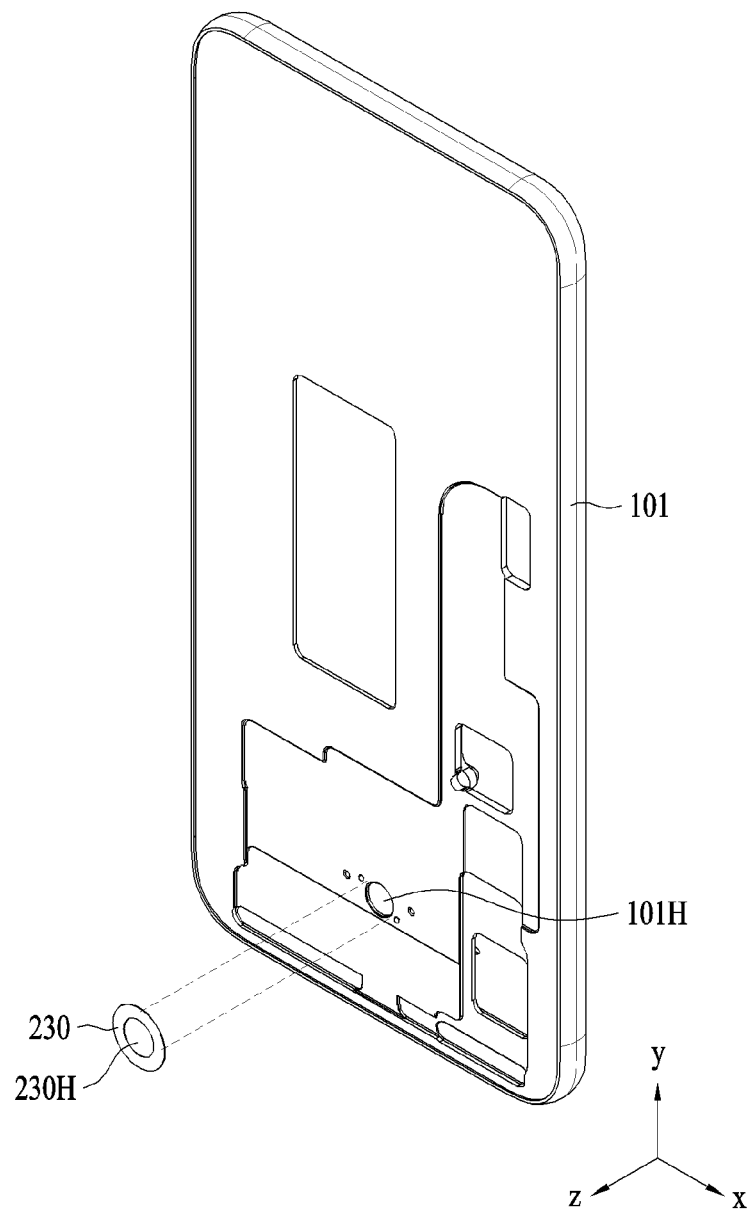
FIGS. 5A and 5B are diagrams schematically illustrating a structure in which a pad part is coupled to a front case in a mobile terminal according to an embodiment of the present disclosure.
Figure 5B:
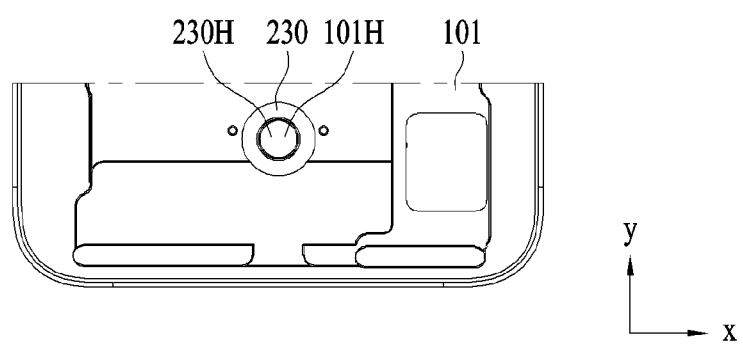

FIGS. 5A and 5B are diagrams schematically illustrating a structure in which the pad part 230 is coupled to the front case 101 in the mobile terminal 100 according to an embodiment of the present disclosure.

Referring to FIGS. 5A and 5B, the front case 101 may include a first hole 101H corresponding to an optical path of light to be incident into the finger scan sensor part 250 shown in FIG. 3. When light reflected by an external object (e.g., a user's finger) is incident into the finger scan sensor part 250, the first hole 101H may play a role of securing the optical path of light to be incident. Although not illustrated in FIGS. 5A and 5B, the finger scan sensor part 250 may be mounted to the rear surface of the front case 101 to correspond to a position in which the first hole 101H is formed.

The pad part 230 may include a second hole 230H corresponding to an optical path of light to be incident into the finger scan sensor part 250. For example, as illustrated in FIG. 5B, when the pad part 230 is coupled to the front surface of the front case 101, the first hole 101H of the front case 101 and the second hole 230H of the pad part 230 may overlap to form an optical path of light to be incident into the finger scan sensor part 250.

With the second hole 230H, the pad part 230 may be formed to cover a substantial portion of the front surface of the front case 101, on the contrary to description of the present disclosure. For example, the pad part 230 may be formed of a heat dissipation sheet to prevent heat emitted by the display 151 from being transferred to another element of the mobile terminal 100 or may be formed of an non-transparent material to minimize interference of light, reflected by an external object and incident into the finger scan sensor part 250, with other light.

The pad part 230 may be formed of a material capable of absorbing shock to protect internal elements of the mobile terminal 100 from an external impact or to prevent the display 151 and the front case 101 from being spaced apart from each other.

Referring back to FIG. 3, the rear case 102 may cover the PCB 220 and 230 disposed at the rear surface of the front case 101.

The battery 191 may be detachably coupled to the rear case 102. The battery 191 may be exposed at the rear surface of the rear case 102 through an opening formed in the rear case 102 to face the rear cover 103.

The rear case 103 may be disposed to cover the rear surface of the rear case and may cover detachable elements, such as the battery 191 exposed at the rear surface of the rear case 102.

Figure 6:
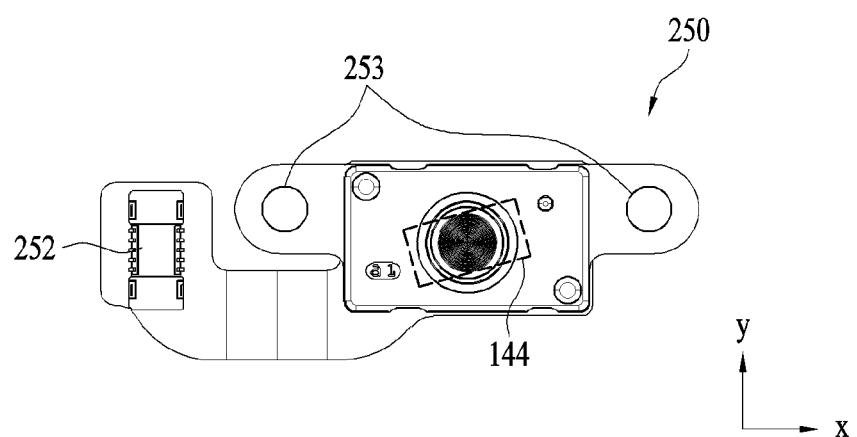
FIG. 6 is a diagram illustrating a finger scan sensor part according to an embodiment of the present disclosure.

FIG. 6 is a diagram illustrating the front surface of the finger scan sensor part 250 included in the mobile terminal 100 according to an embodiment of the present disclosure.

Referring to FIG. 6, the finger scan sensor part 250 may include a finger scan sensor 144 provided inside thereof. In addition, the finger scan sensor part 250 may include the port 252 for electrically connecting the finger scan sensor 144 and the PCB.

The finger scan sensor 144 may be an image sensor including a plurality of pixels capable of sensing light. The plurality of pixels may be arranged along rows or columns partially inclined relative to X direction or Y direction which constitutes the width or the length of the front surface of the mobile terminal 100.

For example, the touch sensor 143 (see FIG. 1) provided in the display 151 (see FIG. 3) may include a plurality of sensing electrodes arranged along the X direction or the Y direction. The plurality of pixels in the finger scan sensor part 250 may be arranged to form an acute angle relative to the X direction or the Y direction in which the plurality of sensing electrodes is arranged.

In other words, the finger scan sensor 144 may be disposed to be inclined relative to the directions that constitute the width and the length of the front surface of the mobile terminal 100.

Since the pixels of the finger scan sensor 144 and the sensing electrodes of the touch sensor 143 are arranged along different rows or columns in the above-described manner, it is possible to minimize an error rate of recognition of a touch input and a fingerprint input sensed by the two sensors.

The appearance of the finger scan sensor part 250 having the finger scan sensor 144 may be in a rectangular shape that is substantially parallel to the directions constituting the width and the length of the front surface of the mobile terminal or directions (e.g., the X direction and the Y direction) in which the sensing electrodes of the touch sensor 143 (see FIG. 1) are arranged.

In other words, the direction in which the pixels provided in the finger scan sensor 144 are arranged may not correspond to the appearance of the finger scan sensor part 250 that covers the finger scan sensor 144. That is, the appearance of the finger scan sensor 144 and the appearance of the finger scan sensor part 250 covering the finger scan sensor 144 may be in a tilted state to each other.

Since the pixels of the finger scan sensor 144 is arranged to form an acute angle relative to the X direction or the Y direction, and the finger scan sensor part 250 covering the finger scan sensor 144 is arranged in parallel with the X direction or the Y direction, it is possible not just to reduce an error rate of fingerprint recognition, but also to make internal arrangement of the mobile terminal more efficient, thereby implementing the mobile terminal in a slimmer and thinner shape.

The finger scan sensor part 250 may include through holes 254 through which the fastening member 260, described with reference to FIG. 4C, is allowed to pass. Using the though holes 253 and the female thread portions (not shown) of the front case 101 (see FIG. 4C), the fastening member 260 (see FIG. 4C) may fasten the finger scan sensor part 250 and the front case 101 to each other.

Figure 8A:
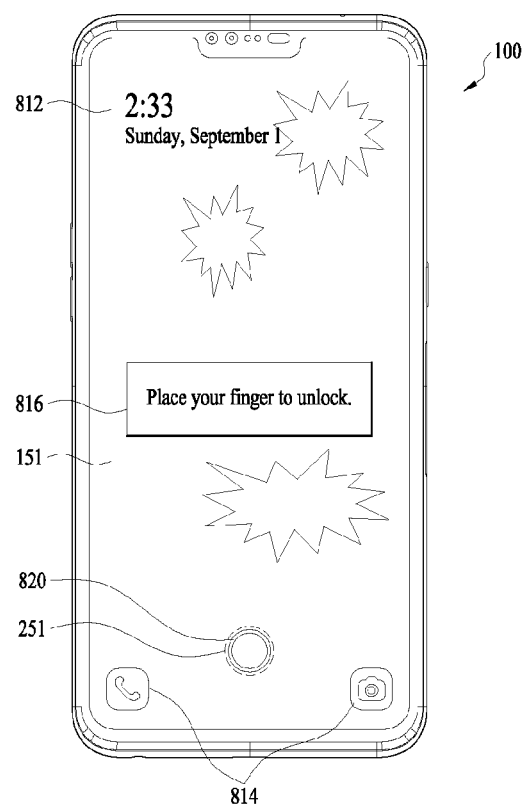
FIGS. 8A to 8C are diagrams illustrating a user interface of a mobile terminal according to an embodiment of the present disclosure.
Figure 8B:
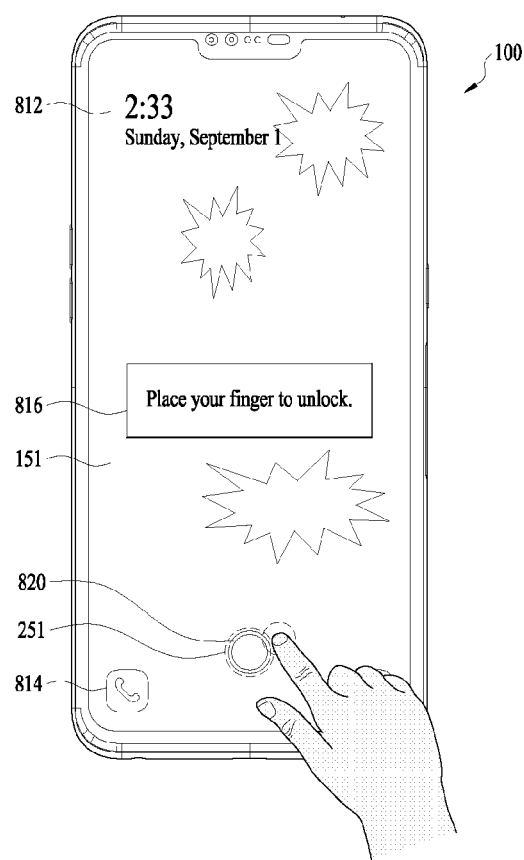
Figure 8C:
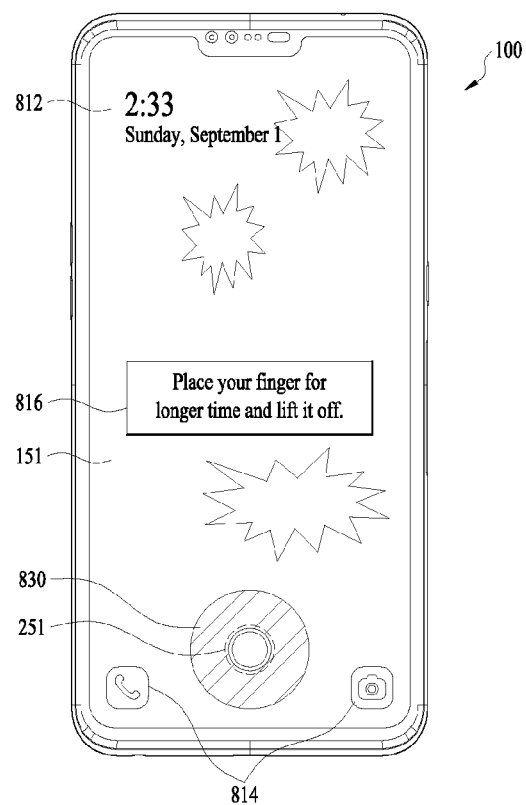

FIGS. 8A to 8C are diagrams illustrating a user interface of a mobile terminal according to an embodiment of the present disclosure.

A mobile terminal 100 according to various embodiments may output a variety of interface screens on a display 151 under control of a controller 180 (see FIG. 1).

In some implementations, when a predetermined period of time elapses while a predetermined input has not been received from an outside, the mobile terminal 100 may enter a power saving mode (or a sleep mode) to minimize unnecessary power consumption. For example, the power saving mode may refer to a turn-off state in which booting is required to switch to a normal mode (or a wake-up mode) or may refer to an inactive state, an idle state, a standby state, or a lower power state.

When the mobile terminal 100 switches from the normal mode to the power saving mode, a predetermined user authentication process may be required for the mobile terminal 100 to switch to the normal mode again. For example, when user authentication is completed based on authentication information received from a user, the mobile terminal 100 may switch to the normal mode.

The user authentication information may include a password, a pattern, and/or user biometric information, and the present disclosure describes the mobile terminal 100 that performs the authentication process using user fingerprint information as an example of the user biometric information, FIGS. 7A to 7D are diagrams illustrating screens of the mobile terminal 100 in an always on display (AOD) state according to an embodiment of the present disclosure.

The mobile terminal 100 may provide an always on display (AOD) function of always outputting a screen to a display 151 even in the power saving mode, for example, based on user setting. For example, when a user sets the mobile terminal 100 such that the AOD function is available even in the power saving mode, the mobile terminal 100 may remain in the AOD state even upon entering the power saving mode and thus may output a specific image through the display 151.

Figure 7A:
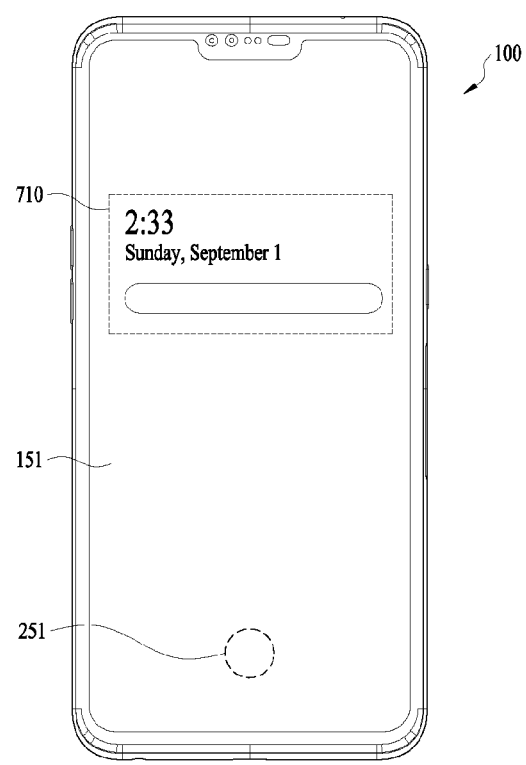
FIGS. 7A to 7D are diagrams illustrating a user interface of a mobile terminal according to an embodiment of the present disclosure.

The mobile terminal 100 may display a first visual object 710 through the display 151 in the power saving mode and the AOD state. For example, as illustrated in FIG. 7A, the mobile terminal 100 may output the first visual object 710 associated with current time and weather information through the display 151 in the AOD state. The first visual object 710 displayed in the AOD state is not limited to the current time and weather information and may include, for example, a visual object associated with at least one of current time information, date information, weather information, notification information regarding a message or a missed call, battery remaining power information, other sensing information, or communication state information.

Figure 7B:
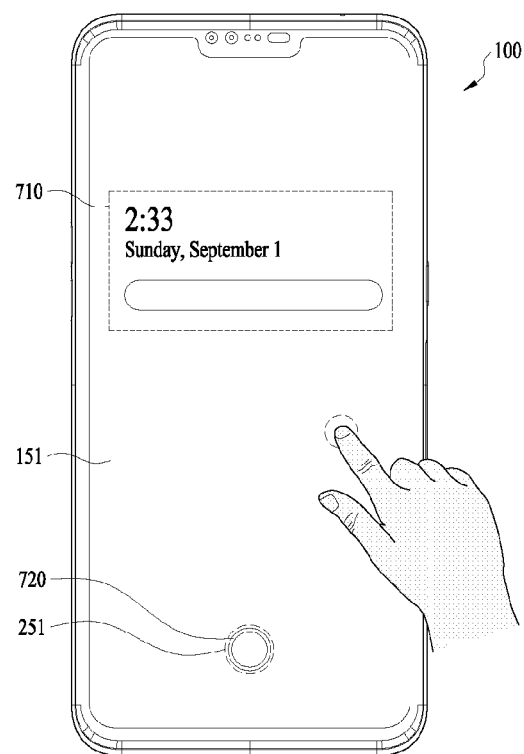

As illustrated in FIG. 7B, the mobile terminal 100 may sense a touch input to a specific position on the display 151 in the AOD state. When a touch input to one region of the display 151 is sensed, the mobile terminal 100 may display a second visual object 720 t guide a position of a fingerprint sensing region 251. In another example, even when a user input is sensed through a mechanical key or the like in the AOD state, the mobile terminal 100 may output the second visual object 720 to a screen The second visual object 720 may be displayed at a position corresponding to a fingerprint sensing region 252 in the display 151. A finger scan sensor part 250 (see FIG. 6), especially a finger scan sensor 144 (see FIG. 6), may be disposed under the fingerprint sensing region 525 where the second visual object 720 is displayed. A user may identify the fingerprint sensing region 252 through the second visual object 720, and accordingly, when the user places a finger at a position where the second visual object 720 is displayed, the finger scan sensor part 250 of the mobile terminal 100 may perform finger scanning and user authentication based on information on light reflected by the finger.

Figure 7C:
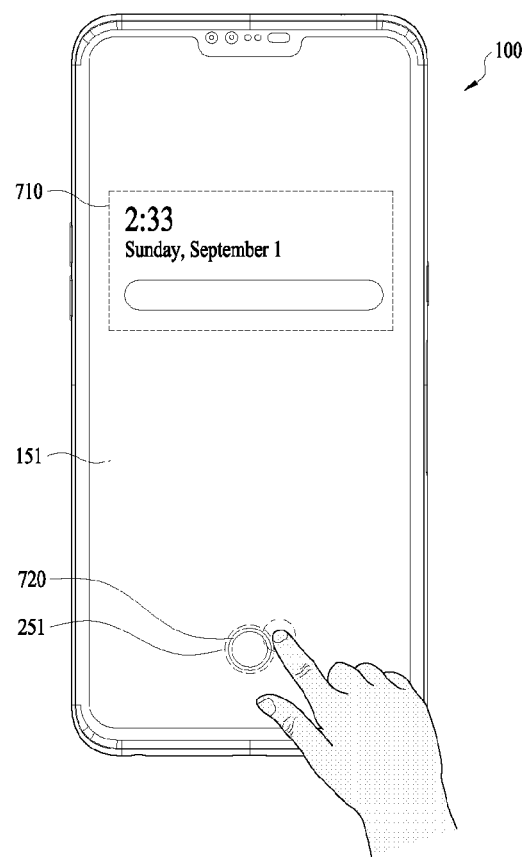

As illustrated in FIG. 7C, when a user's finger touch is input in the surroundings of a position where the second visual object 720 is displayed, the mobile terminal 100 may attempt fingerprint recognition using the finger scan sensor 144 (see FIG. 6). In order for the mobile terminal 100 to accurately sense a fingerprint shape of the finger of the user, the finger should be positioned exactly at the fingerprint sensing region 251, and otherwise the fingerprint recognition may be failed.

Figure 7D:
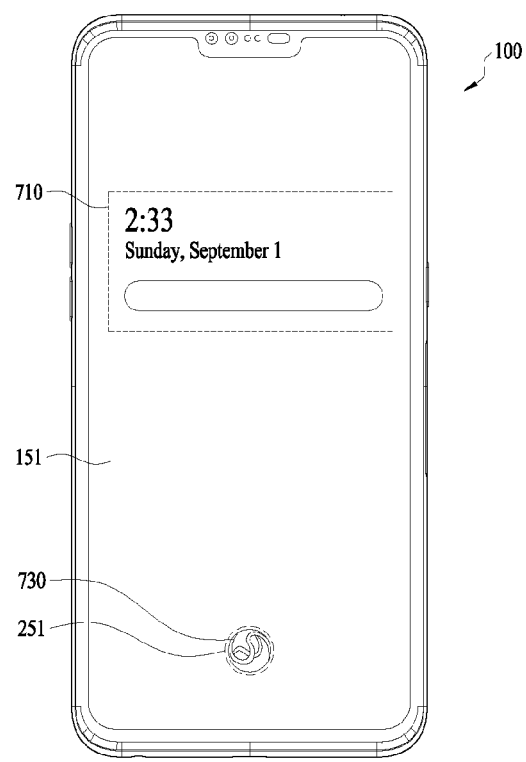

When the fingerprint recognition is failed in a state shown in FIG. 7C, the mobile terminal 100 may change the second visual object 720 to a third visual object 730 and output the third visual object 730, as illustrated in FIG. 7D. In another example, the second visual object 720 and the third visual object 730 may be output together.

In order to highlight the position of the fingerprint sensing region 251, the third visual object 730 may be implemented to have various forms of visual effects in the fingerprint sensing region 251.

The third visual object 730 may perform a function of effectively notify a user of a fingerprint recognition failure and a function of guiding the position of the fingerprint sensing region 251 when the user reattempts fingerprint recognition.

FIGS. 8A to 8C are diagrams illustrating screens in a lock screen state of the mobile terminal 100 according to an embodiment of the present disclosure.

Referring to FIG. 8A, the mobile terminal 100 may display predetermined visual objects on a screen in the lock screen state.

For example, as illustrated in FIG. 8A, the mobile terminal 100 may display, in the lock screen state, at least one of: an object 812 associated with current time, weather, or date information; an object 814 associated with an execution menu of a call application or a camera application; or an object 816 associated with a content for explaining how to release the lock screen state or the like.

The mobile terminal 100 may display, at a position corresponding to the fingerprint sensing region 251 of the display 151, a fourth visual object 820 for guiding the fingerprint sensing region 251.

As illustrated in FIG. 8B, a user may attempt to release the lock screen state by placing a finger in the surroundings of the position where the fourth visual object 820 is displayed. For example, the mobile terminal 100 may release the lock screen state when a predetermined user authentication process is completed through fingerprint recognition. Since the mobile terminal 100 performs the finger recognition using the finger scan sensor 144 (see FIG. 6) disposed under the fingerprint sensing region 251, when a finger is not placed exactly at the fingerprint sensing region 251, the fingerprint recognition may be failed.

Referring to FIG. 8C, the mobile terminal 100 may display a fifth visual object 830 when the fingerprint recognition is failed.

The fifth visual object 830 may be displayed together with the fourth visual object 820 or may be displayed in substitution of the fourth visual object 820. In some implementations, the fifth visual object 830 may be implemented to surround the fingerprint sensing region 251 so as to effectively guide a position of the fingerprint sensing region 251 and may apply a variety of visual effects such as an animation effect.

The fifth visual object 830 may perform not just a function of notifying a user of fingerprint recognition failure, but also a function of effectively guiding a user to the position of the fingerprint sensing region 251.

It will be appreciated by those skilled in the art that various modifications and variations can be made in the present disclosure without departing from the spirit or scope of the inventions.

The foregoing description is to be considered in all respects as illustrative and not restrictive. The scope of the invention should be determined by reasonable interpretation of the appended claims and all change which comes within the equivalent scope of the invention are included in the scope of the invention.

The invention claimed is:

1. A mobile terminal, comprising:
a front case;
a display disposed at a front surface of the front case;
a rear case disposed to oppose a rear surface of the front case; and
a finger scan sensor part coupled to the rear surface of the front case,
wherein the finger scan sensor part is configured to sense at least a portion of light incident after passing through the display and the front case among light reflected by an external object,
wherein the finger scan sensor part is fixed to the rear surface of the front case by a fastening member and mounted on a rear surface of a printed circuit board (PCB) electrically connected with the finger scan sensor part, and
wherein a finger scan sensor provided inside the finger scan sensor part comprises a plurality of pixels arranged to form an acute angle relative to a row direction or a column direction of the finger scan sensor part.

2. The mobile terminal of claim 1, wherein the front case comprises a first hole that forms an optical path of light to be incident into the finger scan sensor part.

3. The mobile terminal of claim 1, wherein the fastening member fixes the finger scan sensor part to the rear surface of the front case through screw fastening.

4. The mobile terminal of claim 3, wherein the front case comprises a plurality of female thread portions for the screw fastening.

5. The mobile terminal of claim 3, wherein:
the fastening member fixes the finger scan sensor part and the PCB to the front case through the screw fastening.

6. The mobile terminal of claim 5, wherein the display is electrically connected with the PCB.

7. The mobile terminal of claim 1, wherein:
the display comprises a touch sensor having a plurality of sensing electrodes.

8. The mobile terminal of claim 1, further comprising a pad part filling a space between the display and the front case,
wherein the pad part has a second hole corresponding to an optical path of light to be incident into the finger scan sensor part.

9. The mobile terminal of claim 1, wherein the finger scan sensor part is configured to sense at least a portion of light reflected by the external object among light output through the display.

10. A mobile terminal, comprising:
a display configured to output an image in a first direction;
a front case covering a rear surface of the display facing a second direction opposite to the first direction;
a pad part interposed between the front case and the display;
a rear case disposed to oppose the rear surface of the front case, the rear surface facing the second direction;
a rear cover covering the rear surface of the rear case, the rear surface facing the second direction; and
a finger scan sensor part coupled to the rear surface of the front case,
wherein the pad part and the front case respectively have holes corresponding to a position at which the finger scan sensor part is disposed,
wherein the finger scan sensor part is configured to sense at least a portion of light incident after passing through the display, the hole of the pad part, and the hole of the front case among light reflected by an external object,
wherein the finger scan sensor part is fixed to the rear surface of the front case by a fastening member and mounted on a rear surface of a sub printed circuit board electrically connected with the finger scan sensor part, and
wherein the sub printed circuit board is electrically connected with a main printed circuit board.

11. The mobile terminal of claim 10, wherein the hole of the pad part and the hole of the front case form an optical path of light to be incident into the finger scan sensor part.

12. The mobile terminal of claim 10, wherein the display is electrically connected with the sub printed circuit board.

13. The mobile terminal of claim 10, wherein a part of the main printed circuit board is located at upper position of a battery, and a part of the sub printed circuit board is located at a lower position of a battery.

* * * * *